Dec. 3, 1968  W. D. BALLARD  3,413,914
JUNKED METAL COMPRESSING SMASHER
Filed June 3, 1966  2 Sheets-Sheet 1
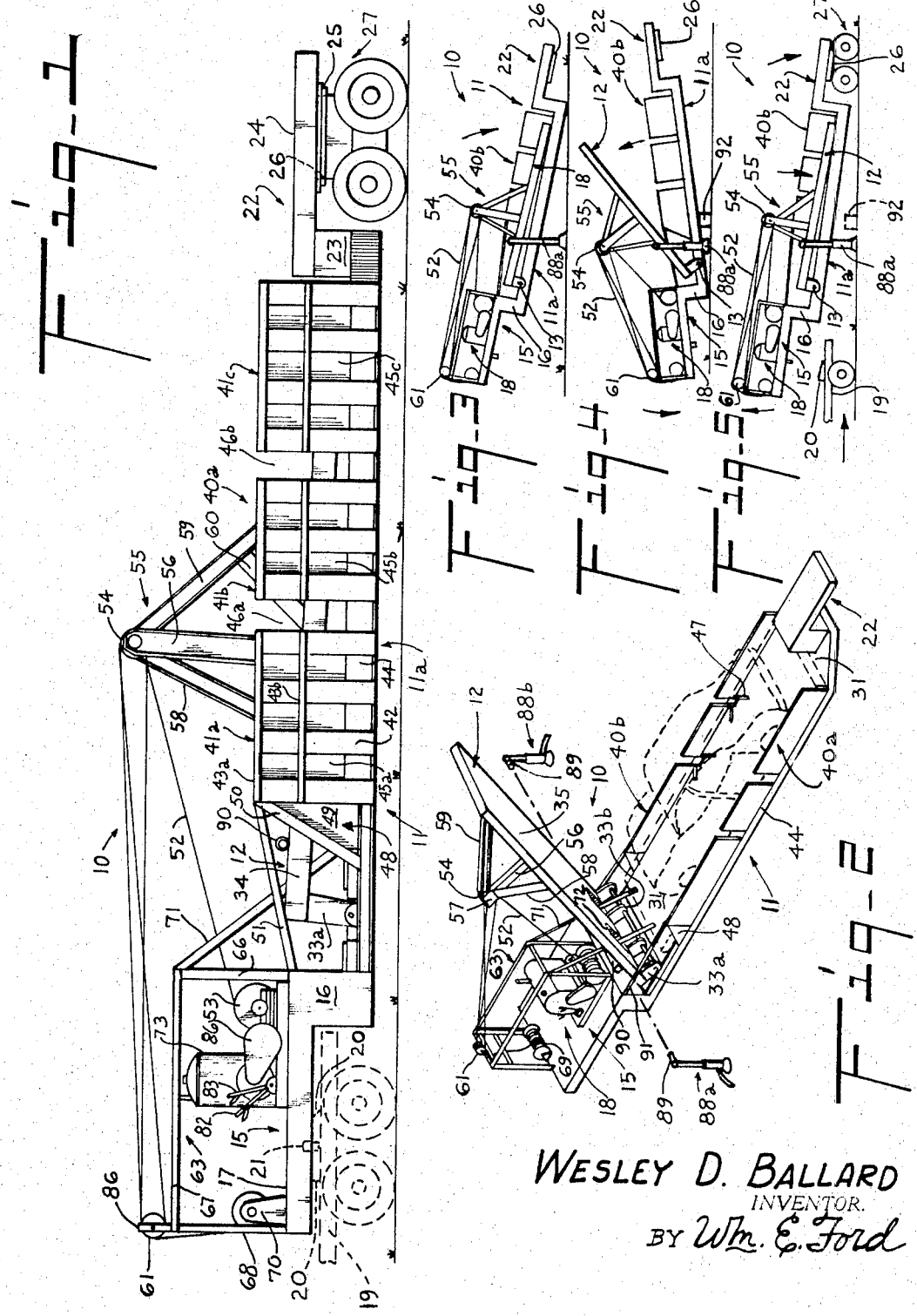
WESLEY D. BALLARD
INVENTOR.
BY Wm. E. Ford
ATTORNEY Dec. 3, 1968  W. D. BALLARD  3,413,914
JUNKED METAL COMPRESSING SMASHER
Filed June 3, 1966  2 Sheets-Sheet 2
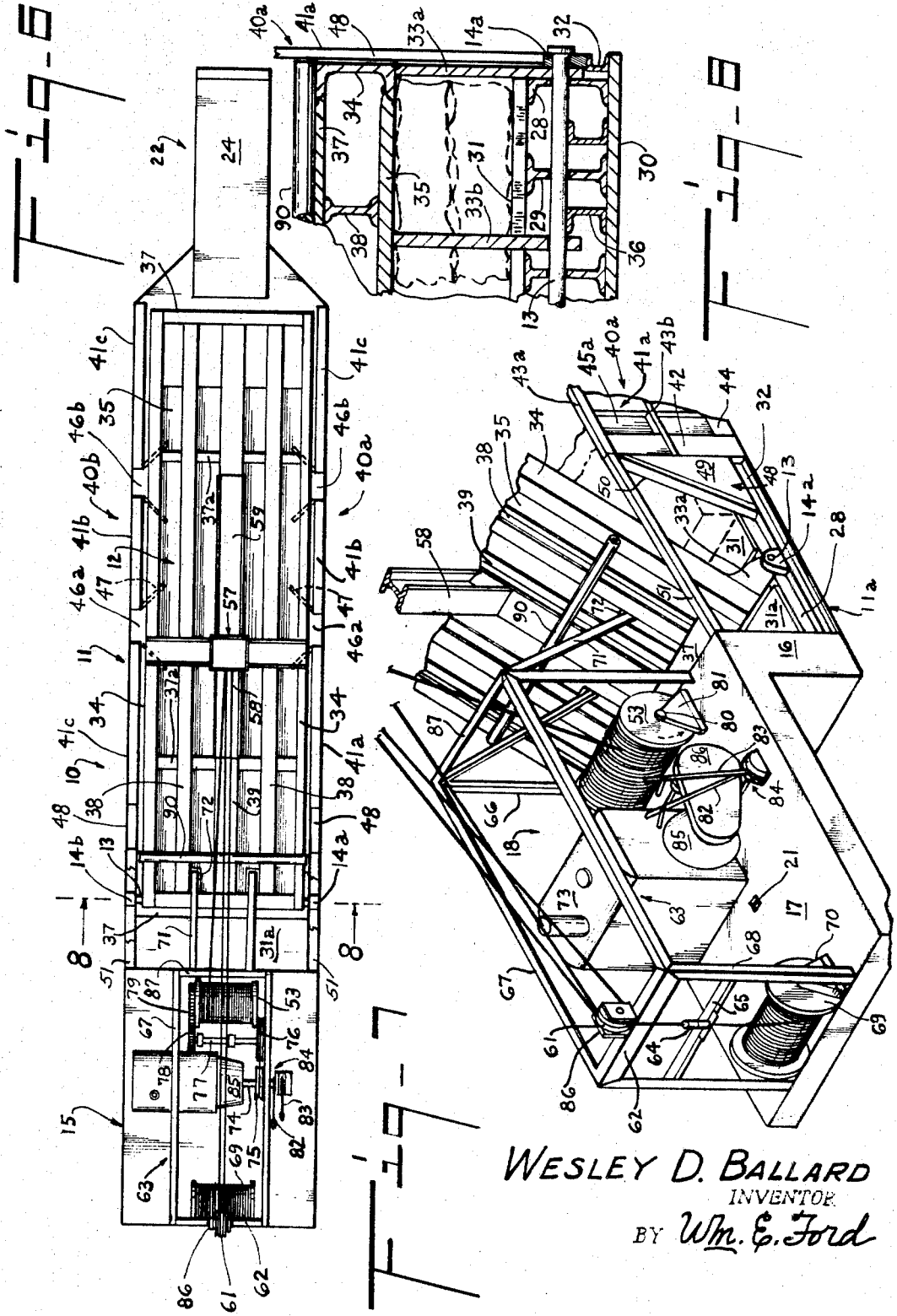
WESLEY D. BALLARD
INVENTOR
BY Wm. E. Ford
ATTORNEY United States Patent Office 3,413,914
Patented Dec. 3, 1968

3,413,914
JUNKED METAL COMPRESSING SMASHER
Wesley D. Ballard, Phoenix, Ariz., assignor of fifty
percent to Henry V. Gonzales, Phoenix, Ariz.
Filed June 3, 1966, Ser. No. 555,187
6 Claims. (Cl. 100—100)

ABSTRACT OF THE DISCLOSURE

The invention includes a base with bed therearound, successive bodies, as automobile bodies, placed on the base being smashed by a hammer with forward end mounted on a transverse pivot across the base. A support, cantilevered forwardly, has forward sheave means, cable dead end, and clutch-connected, engine driven reel mounted thereon, with reel cable extending to a rear sheave means on a frame upstanding from hammer and thence back and forth between rear and forward sheave means. Engine drive is de-clutched for reel free-wheeling to run off cable as hammer descends, and is enclutched to elevate the hammer.

---

This invention relates to a junked metal compressing smasher or machine designed especially to crush rather large metallic objects such as automobile bodies with or without the frame parts thereof.

The machine may be used to smash various objects, metallic or non-metallic, into more compact masses, for various usages, but has a special adaptation for smashing junked automobile bodies into more compact masses, so that bodies thus smashed and compressed may be hauled more economically to the locations of larger compressing and processing machinery to be further compacted prior to delivery to the steel mills. The benefits to be derived from this initial compressing at a junk location is obvious since it can be appreciated that the volume of space occupied by an uncompressed junked automobile is very large in comparison to the value of the junked metal therein, so by compressing such junked bodies, trucks may be loaded up to maximum weight load capacity to carry a substantial number of such compressed bodies per load, whereas only one or two uncompressed bodies can be loaded on a conventional truck bed for hauling.

It is consequently a primary object of this invention to provide a junked metal compressing smasher of this class which is adapted to compress metallic objects, as metallic chassis and frame parts, into more compact or reduced sizes for more economical hauling.

It is also another object of this inevntion to provide a machine of this class which is preferably portable so that it may be taken to the location of junked metal at remote locations from larger types of metal compacting and processing machinery.

It is a further object of this invention to provide a smasher of this class which includes a heavy hammer that is hinged at one end and adapted to be power lifted and gravity lowered to smash an object, as a junked automobile on a bed or base from which the hammer is pivoted, the base providing side walls and a rear end to upstand from the bed to form a die or restraining form, thus limiting the spread of the crushed metal.

It is also an important object of this invention to provide a smasher of this class with bed side walls providing openings therein and means to insure the easy disposition of the lifts of fork lift trucks with relation to the bed or base in handling uncrushed bodies onto, and compressed bodies from off, the base.

It is also another and important object of the invention to provide a smasher of this class with a bed adapted to hold a plurality of smashed car bodies, as crushed one at a time, up to the number of crushed bodies that is within the load carrying capacity of the particular fork lift truck that is available for feeding bodies to the smasher.

It is still another object of the invention to provide a smasher of this class which may be handled from a truck and tandem wheels onto the ground into smashing position, and back onto a truck and tandem wheels for transportation, in manner that only a pair of jacks is necessary in handling.

It is yet a further object of the invention to provide a metal body crushing machine or smasher of this type which is constructed in manner to require limited head room in transportation so that it may pass under underpasses, overhead bridges, and the like without difficulty.

It is also a further object of the invention to provide a smasher of this type which has a heavily weighted hammer designed to be raised rapidly to be freed to descend by gravity with inappreciable friction and great smashing impact.

Other and further objects will be apparent when the specification herein is considered in connection with the drawings, in which:

FIG. 1 is a side elevational view of a smasher comprising an embodiment of the invention with front end pivotally connected to the fifth wheel on the end of a trailer, or behind a truck or prime mover, the rear end being supported on a tandem wheel unit;

FIG. 2 is an isometric view of a smasher as shown in FIG. 1, the machine being shown in operating position ready to crush a second automobile body on top of a first body that has already been crushed as restrained to predetermined spread by the bed of the machine; the position shown also being the position of hammer disposition when the jacks are applied to reload the smasher on trailer and tandem;

FIG. 3 is a small scale side elevational view, showing the machine disclosed in FIGS. 1 and 2 with hammer in the second position for reloading;

FIG. 4 is a small scale side elevational view of the machine shown in FIG. 3, with hammer in the third position of reloading;

FIG. 5 is a small scale side elevational view of the machine shown in FIG. 3, with hammer in the fourth or last position of reloading;

FIG. 6 is a plan view of the smasher shown in FIGS. 1, 2 and 3;

FIG. 7 is a fragmentary, isometric view of the smasher shown in FIGS. 1, 2, 3 and 6; and FIG. 8 is a fragmentary, transverse elevational view, part in section, looking rearward at the station of the hammer pivot shaft, as taken along line 8—8 of FIG. 6.

Referring now in detail to the drawings in which like reference numerals are applied to like elements in the various views, a junked metal compressing smasher or crushing machine 10 is shown in detail in FIGS. 1–2, and in FIGS. 6–8, with the machine comprising essentially a base 11 and a hammer 12 pivotally mounted on a pivot shaft 13 journalled at either end in brackets 14a, 14b connected to the base 11.

At its forward end the base 11 includes a forward cantilevered construction 15 which includes a strong upright part 16 upstanding from the forward end of the base 11 and an operator's platform 17, cantilevered forwardly therefrom to provide a support for the operational mechanism 18 and to rest, in transit, as on the rear end of a truck bed or trailer 19, and centrally over a fifth wheel construction 20 carried on the rear end 19, so that a pivot bolt 21 may be installed downwardly, centrally through the platform 17 and through the conventional socket or bore provided therefor in the fifth wheel, thus to provide a vertical pivotal connection between the crusher or smasher 10 and the truck bed or trailer 19 of the prime mover which pulls the smasher.

At its rear end the base 11 includes a rearward cantilever construction 22 with a strong upright part 23 upstanding from the rear end of the base 11 and a horizontally extending cantilevered part 24 to the rear thereof having a downwardly opening angle box or rectangular extension frame 25. A tandem unit or assembly 27 of two pair of traction wheels has an upper part comprising a rectangular boss 26 which is received or fitted into the angle frame 25 beneath the cantilever part 24 whereby the rear part of the crusher 10 is supported in transit. Additionally, bolts, not shown, may bolt the rear cantilever part 24 to the tendem unit 27.

The central portion of the base 11 or the base proper 11a, is comprised of longitudinal members in the form of sturdy structural shapes, as inwardly facing channels 28 outermost, with I-beams 29 transversely spaced apart centrally thereinbetween, these beams or shapes being connected forwardly to the rear of the forward upright 16 and rearwardly to the rearward upright 23. As best shown in FIG. 8, these structural members are tied together by a lower base plate 30 to which they are welded. Also they are tied together by, and welded upwardly to, an upper base plate 31 which extends over the beams, from just to rear of the hammer pivot to the rear cantilever construction 22.

Additionally at the forward end of the base central portion 11a, the beams 28 and 29 are floored by a top plate 31a forwardly of the hammer pivot. Also, on each side, forwardly, smaller, outwardly facing channels 32 are provided to extend rearwardly and to support on each side the respective brackets 14a, 14b in which are journalled the ends of the hammer pivot shaft 13. Between its respective ends the pivot shaft 13 passes through a succession of spaced apart upright legs or members of the hammer 12, the outer legs 33a being connected upwardly to the respective outer, longitudinally extending, structural members or inwardly facing channels or hammer runner members 34.

Between the outer legs 33a, spaced apart central or inner legs 33b are connected upwardly to a transversely extending structural or hammer plate 35 which extends from channel 34 on one side to channel 34 on the other side. Also, the pivot shaft 13 is supported by longitudinally extending, smaller channels 36, which are disposed between the I-beams 29, and between the I-beams 29 and outer structural members or channels 28, and which extend rearwardly from the forward cantilever upright 16, and which are welded to and supported upon, the lower base plate 30.

The forward and rear ends of the hammer are tied together, between the ends of the channels 34, by structural plates or angles 37, and spaced inwardly of the outer beams or runner channels 34 the hammer 12 includes I-beams 38, with a larger, central I-beam 39 being spaced centrally between the I-beams 38. Also, longitudinally spaced apart cross-connecting members 37a are provided between the beams as transverse elements. It should be noted that the hammer, for weight, may be constructed of other and heavier shapes, to meet performance requirements, and also the base 11 can be constructed of various heavy shapes and forms to withstand the pounding imposed upon it in service.

In order to restrain the automobile bodies crushed up on the base 11 substantially to predetermined plan areas and thicknesses, respective side walls or upright side members 40a, 40b are provided to extend along the base 11 on either side thereof, the walls being comprised of respective forward, central and rear sections 41a, 41b, 41c, respectively, with each section comprised of upright beams 42, longitudinally extending runners or upper and central connecting members 43a, 43b, and a longitudinally extending beam, channel or lower runner 44 extending between the uprights 42 for the length of the side wall sections. The inner surfaces of the side walls, which form the die or restraining elements channelizing the spread of junked metal when a car body is crushed, comprise forward, central and rear plates 45a, 45b, 45c.

Vertically extending slots 46a, 46b are thus provided between the respective wall sections 41a, 41b and 41b, 41c which are slightly greater in width than the width of the forks or fingers of the conventional fork-lift truck lifts, as will be hereinbelow described, the slots extending from the tops of the walls downwardly to the tops of the respective runners 44.

Also, in connection with the operation of the fork lift trucks which handle the positioning upon, and removal of the automobile bodies from, the base plate 31, a pair of pipe or half-pipe sections 47 are welded to the top plate 31 of the base 12, which extend outwardly from the respective slots 46a, 46b over the plate 31, as indicated in FIG. 2, and in dotted lines in FIG. 6.

At the forward end of each side wall forward section 41, a triangularly shaped gusset or forward brace 48 is provided, comprised of a triangularly shaped plate 49 and a diagonally extending structural member, as a channel 50, the base of the gussets 48 being connected to, and supported upon the respective side channels 32. Also, cross-connecting beams, bars, or brace elements 51 are connected forwardly to the respective rear top corners of the cantilever upright 16 and rearwardly to the top of the respective gussets 48 and forward corners of the forward side wall sections 41a.

The hammer 12 is lifted and lowered by a cable 52, one end of the cable being dead-ended on the reel drum of a winch 53 mounted on the rear portion of the forward cantilever platform 17. From the drum 53 the cable extends under a sheave of a double sheave pulley 54 mounted at the top of an A-frame 55 which upstands from the central portion of the hammer 12. In detail the A-frame 55 comprises opposed, transversed structural channels 56 which extend diagonally upwardly from their connections to the hammer side runners 34, to an apex in the form of the housing and mount 57 for the pulley 54, such mount 57 being best shown in FIGS. 2 and 6, but being omitted for purposes of clarity in FIG. 1. The A-frame is completed by a forward diagonally extending I-beam 58 from the central longitudinal beam 39 of the hammer to the apex 57, and by a rearward diagonal extending I-beam 59, from the I-beam 39 to the apex 57, the brace member 59 being in turn braced by a diagonally extending member 60, as indicated in FIG. 1.

The cable 52 extends upwardly around the rear part of the first sheave of the pulley 54 and forwardly and downwardly around the forward part of the first sheave of a double sheave pulley 61 which is mounted in a bracket assembly 86 carried centrally on top of the top transverse member 62 of a frame 63 which upstands centrally above the cantilever platform 17. Thence the cable 52 extends rearwardly and under and around the rear part of the second sheave of the A-frame pulley 54, and over and back forwardly over the second sheave of the forward pulley 61, and downwardly around the forward part of such second sheave, to terminate functionally in a clamp 64 which is mounted upon a cross-brace or cross-tie member 65, spaced under and parallel with the transverse member 62, and thus between the two forward uprights 66 of the frame 63.

The frame 63 additionally includes two spaced apart, longitudinally extending runners 67 between the tops of the forward uprights 66 and the tops of the rear uprights 68 which upstand from the rear part of the platform 17; a transverse member 87 tying together the tops of the rear uprights 66, and the transverse member 62 tying together the forward uprights 68, as aforesaid. Also, the frame 63 may include adequate conventional cross-bracing, or diagonally extending members, not shown, in order to provide clarity of disclosure for the parts shown.

The cable 52 extends downwardly from the clamp 64, which dead-ends it to the frame 63, and around a reserve drum 69 which is supported by, and has its shaft journalled in, brackets 70 which are mounted on the forward part of the platform 17.

Since the frame 63 functionally dead-ends the forward end of the cable 52, its component structural elements should be of substantial strength, and in effect the frame 63 comprises a truss. To this end, diagonally extending brace members 71 extend downwardly from the top elements at the rear of the frame 63, through slots 72 in the hammer 12, and are affixed to the top surface of the upper plate 31 of the base portion 11a, thus to strengthen the base longitudinally. Also, for strength purposes, the forward braces 48 of the side wall forward sections 41a are connected by strong cross-ties 91 to the forward cantilever uprights 16.

A gasoline engine 73 is mounted on the platform 17 to drive the winch 53 which pays out and takes up the cable 52, the engine shaft 74 having a pulley 75 mounted thereon to drive, through conventional sprocket chain or belting, a pulley 76 on one end of a jack-shaft 77 which is journalled in, and supported by conventional pillow blocks mounted on the platform 17 to the rear of the engine 73. A pinion 78 is mounted on the other end of the jack-shaft 77 to mesh with a large gear 79 on the end of the winch shaft 80, the winch shaft 80 being properly journalled in, and supported by, brackets 81 which upstand from the platform 17. A conventional transmission guard 86 is provided for the pulley 75, 76, as shown in FIG. 7, and a corresponding guard, not shown, may be provided for the gear 79 and pinion 78.

The operator's position on the platform 17 is determined by the location of the operating levers 82, 83, which are shown mounted on the platform 17, more or less diagrammatically, to indicate that the operator's post must be laterally outward from the engine shaft 74, the levers being operatively connected by connection means 84, also indicated diagrammatically in FIG. 7, to select direction of winch rotation (to take up or pay out cable) and to clutch-connect the engine shaft 74 to be driven. Thus, the lever 82, through connection means 84, may operate clutch means, as within the frustoconical engine housing part 85, to connect the engine shaft 74 to drive the winch 53, and the lever 83, by its position, disposes the connection means 84 in manner to determine direction of winch drum rotation. The dotted line arrow thus indicates that the winch drum 53 has rotated in counter-clockwise direction to raise the hammer 12.

A strong pipe 90 is shown in the drawings extending transversely across the hammer 12 near the forward end thereof, the pipe 90 being affixed to the structural members 34, 38, 39 as by welding. Also, in FIG. 2, two opposed jacks 88a, 88b, indicated diagrammatically as hydraulic jacks, are shown as being provided with transversely extending support arms or bars 89, from the tops or heads of the jacks 88a, 88b, such supports being of diameter to be slid into the socket providing ends of the pipe 90 when the hammer 12 is raised to position the axis of the pipe 90 in co-axial alignment with the support bar axis when the jacks have been manipulated to raise the support bars to a predetermined level.

If the cable 52 is now freed, by manipulation of the levers 82, 83 on the platform 17, whereby the hammer 12 may descend by its own weight, downwardly from the position shown in FIG. 2, the rearward end of the machine 10 may be scraped slightly forwardly along the ground as the forward end of the machine 10 pivots upwardly about the support and pipe axis into the air, as shown in FIG. 3.

In this position the rear end cantilever 22 is too low to receive a tandem unit 27 thereunder as a first step in transferring the machine 10 from ground to wheeled support. Also, in relationships of hammer pivot 13 with pivot pipe 90 on machines, the hammer 12 could be raised high enough to lift the jacks 88a, 88b off the ground sufficiently to let the machine base 11a return to sit flat upon the ground, the same as shown in FIG. 2, thereby making no progress.

However, if, as shown in FIG. 4, a block or log 92 is placed under the base 11a, a predetermined distance to the rear of the transverse plane of the jacks 88a, 88b, and parallel thereto, the hammer 12 might then be raised to such a height to lift the jacks 88a, 88b from the ground a very slight distance, whereby the forward upper corner of the block 92 becomes the fulcrum, and the forward corner of the cantilever upright 16 moves to the ground as the rear end of the machine 10, including the cantilever 22, is carried upwardly into the air.

The raising of the hammer 12 to the position shown in FIG. 4 has taken the load off of the jacks 88a, 88b, as aforesaid, but when the hammer is lowered again, the jacks seat again and the load is transferred from the block 92 to the jacks, and as the hammer is further lowered the forward end of the machine 10 moves upwardly about the fulcrum of pipe 90 and support bars 89 therein, and the rear end of the machine 10 moves downwardly. As this takes place the tandem unit 27 is wheeled beneath the rear cantilever section 22 and manipulated, so that as the frame 25 descends, the aforesaid described rectangularly cross-sectioned boss or tandem unit upper frame part 26 is received within the frame part 25 on the under side of the cantilever member 24. Thus, as shown in FIG. 5, the rear end of the machine 10 now bears on the rear portion of the tandem unit upper part 26, while the hammer 12 has been fully lowered to rest on the rear part of the base 11a, the forward end of the machine 10 still being raised amply above the rear part of a trailer or prime mover 19 which is being backed under such forward end. At this stage the hydraulic fluid pressure lifting the upper parts of the jacks 88a, 88b may be released to let the upper parts of the jacks descend, and consequently the forward end of the machine 10 may descend as the rear end 19 of the truck is maneuvered to place its fifth wheel 20 in position to have the fifth wheel connection member 21 installed through the platform 17 to connect the prime mover 19 and machine 10, whereby the machine 10, by the use of the hammer 12 in cooperation with the jacks 88a, 88b, has rapidly been transferred from ground support to wheeled support. It should well be appreciated that the adaptability of the machine 10, which has to be quite heavy to function as intended, to be changed from operative ground support to wheeled support for transport to further locations of junked metal bodies, can provide a highly competitive advantage to an operator of such a machine as will be further emphasized in detail hereinbelow.

The invention is designed to solve at least one economic problem, that of inexpensively transferring junked automobile bodies from out-of-the-way locations, or smaller lots, as found in smaller sized cities, to large cities where economy permits the provision of means whereby automobile bodies may be further processed to be handled in reduced bulk, as in compressed bales, or shredded metal bundles, on the route of junked metal to steel mill furnaces.

The provision of side walls to complete a bed, permits a plurality of bodies to be handled, one after another being crushed to the height of the bed, to make a load to the capacity of a fork-lift truck load. Thus, the quickly crushed loads may be handled from the bed of the machine and loaded to the capacity of a truck bed, or truck load capacity, so that several fork-lift truck loads can be carried in one hauling truck load, to the site of a massive shredder or baling press, or directly to the site of a steel mill furnace.

When it is considered that each year much steel and other ferrous metal rusts away and is dissipated into the atmosphere because of the marginal profits involved in hauling only a few uncrushed automobile bodies per load from remote locations, it can be appreciated that the aforesaid machine comprises a substantial contribution to the national economy.

The invention is not limited to the exact structures hereinabove described but other structures are considered as long as such may fall within the broad spirit of the invention, and within the broad scope of interpretation claimed for, and merited by, the appended claims.

What is claimed is:

1. A machine as for smashing junked metal, as automobile bodies, and comprising a base providing a bed and bed members including upstanding side walls, an end member, and a forward, cantilevered support member, a hammer with a forward end mounted on transverse pivot means on said base forward of said bed, said hammer including a smashing portion extending rearwardly from said forward end and providing a compressing contact underside area for disposition above, and substantially co-extensive with said bed, operational means including forward sheave means on the forward end of said support member, rear sheave means on a frame included by said hammer and upstanding therefrom, a reel on said support member, and cable passing from said reel and back and forth between said rear and forward sheave means and dead-ended on said support member, said operational means also including engine means clutch-engageable to drive said reel to take up cable to lift said hammer, said reel being clutch-disengageable from engine means drive for free wheeling as cable runs off therefrom, as said hammer falls substantially gravitationally by its weight to smash a body, disposed on said bed, down to a substantially predetermined decreased height as constrained in said bed, said cable remaining in operative connection with said hammer during its fall.

2. A machine as claimed in claim 1 in which the hammer forward end extends substantially perpendicularly downwardly from the rearwardly extending smashing portion, and for a distance equal to the smashed thickness dimensions of a plurality of smashed bodies.

3. A machine as claimed in claim 1 in which said side walls have two pair of opposed slots therein above said base, and of width to receive fork-lift truck forks therethrough, whereby a load of smashed bodies may be automatically handled from said base.

4. A machine as claimed in claim 1 in which said bed end member comprises a rearwardly cantilevered section, said machine also including for transportation a wheeled unit adapted for supporting connection below said rearwardly cantilevered section, and said forwardly cantilevered section being adapted for connection to the fifth wheel on the rear end of a prime mover vehicle.

5. A machine as claimed in claim 1 which includes a pair of separately carried opposed jacks, said hammer including means near the forward end thereof to provide opposed, transversely aligned sockets, and said jacks including horizontal supports extending horizontally from the top members thereof to be received in said sockets, whereby, by hammer manipulation by said operational means, said machine may be transferred selectively from wheel to ground, and from ground to wheel support.

6. A machine as for smashing junked metal, as automobile bodies, and comprising a base providing a bed and bed members including upstanding side walls and an end member, a hammer with a forward end mounted on a transverse pivot forward of said bed, said hammer providing a compressing contact underside area for disposition above, and substantially co-extensive with said bed, operational means on said base forward of said hammer pivot and including hammer lift and lowering means with a permanent operative connection to the upper side of said hammer, said operational means including a release means for said operative connection whereby said hammer may fall substantially gravitationally by its weight to smash a body, disposed on said bed, down to a substantially predetermined decreased height as constrained in said bed, said side walls providing two pair of opposed slots therein above said base, and of a width to receive fork-lift truck forks therethrough, said base having a pair of spacers extending over said base diagonally away from the sides of each slot, whereby a lowermost smashed body may be spaced slightly above said base inwardly of each slot, and whereby fork-lift truck forks may be inserted with facility under said lowermost smashed body to obtain an easy lift purchase to handle a load of smashed bodies from said base.

References Cited

UNITED STATES PATENTS

| 937,436 | 10/1909 | Haag | 100—265 XR |
| 2,529,892 | 11/1950 | Adams. | |
| 2,986,992 | 6/1961 | Patros et al. | 100—218 |
| 2,997,942 | 8/1961 | Dunham et al. | 100—265 XR |
| 3,036,516 | 5/1962 | Purcell | 100—265 XR |
| 3,237,554 | 3/1966 | Davis | 100—218 |

FOREIGN PATENTS

| 218,745 | 7/1924 | Great Britain. |

BILLY J. WILHITE, *Primary Examiner.*